United States Patent [19]
Badejo et al.

[11] Patent Number: 5,741,356
[45] Date of Patent: Apr. 21, 1998

[54] PROCESS FOR SURFACE-TREATED ORGANIC PIGMENTS

[75] Inventors: Ibraheem T. Badejo, N. Charleston; Charles E. Shannon, Summerville, both of S.C.; Guenter G. Franke, Leverkusen, Germany

[73] Assignee: Bayer Corporation, Pittsburgh, Pa.

[21] Appl. No.: 769,478

[22] Filed: Dec. 20, 1996

[51] Int. Cl.$^6$ .................................................. C08K 5/17
[52] U.S. Cl. .......................... 106/493; 106/31.6; 106/500
[58] Field of Search .................................. 106/493, 500, 106/31.6

[56] References Cited

U.S. PATENT DOCUMENTS

| | | | |
|---|---|---|---|
| 3,342,828 | 9/1967 | Vorobjeva | 260/294.7 |
| 4,238,386 | 12/1980 | Babler | 260/42.21 |
| 4,250,079 | 2/1981 | Babler | 260/42.21 |
| 4,588,576 | 5/1986 | David | 423/608 |
| 4,929,279 | 5/1990 | Hays | 106/412 |
| 5,362,780 | 11/1994 | Babler et al. | 524/88 |

FOREIGN PATENT DOCUMENTS

| | | |
|---|---|---|
| 227779 | 11/1985 | Czechoslovakia . |
| 0544441 | 11/1992 | European Pat. Off. . |
| 63-305172 | 12/1988 | Japan . |

OTHER PUBLICATIONS

W. Herbst & K. Hunger, Industrial Organic Pigments. New York: VCH Publishers Inc. 1993 (month unavailable) pp. 205–207.

*Primary Examiner*—Deborah Jones
*Attorney, Agent, or Firm*—Joseph C. Gil; Richard E.L. Henderson

[57] ABSTRACT

This invention relates to a process for preparing pigment compositions comprising
(a) treating an organic pigment with
 (1) about 0.1 to about 100% by weight, relative to the organic pigment, of a sterically hindered and/or bulky primary amine,
 (2) 0 to about 100% by weight, relative to the organic pigment, of a surfactant, and
 (3) about 5 to about 15 parts by weight per part by weight of the organic pigment of a liquid in which the organic pigment is substantially insoluble,
thereby forming a suspension of the surface-treated pigment composition in the liquid;
(b) exposing the suspension to cavitating conditions; and
(c) collecting the pigment composition.

13 Claims, No Drawings

PROCESS FOR SURFACE-TREATED ORGANIC PIGMENTS

BACKGROUND OF THE INVENTION

This invention relates to a process for preparing pigment compositions having improved dispersibility, for example, in plastics and other macromolecular materials by surface treating organic pigments with certain sterically hindered and/or bulky primary amines and optional dispersants under cavitating conditions.

Surface treatment is a type of finishing in which certain auxiliaries, such as rosin or other resins, are applied to pigments to influence their surface structure and thus their physical and coloristic properties. E.g., W. Herbst and K. Hunger, *Industrial Organic Pigments* (New York: VCH Publishers, Inc., 1993), pages 205–207. Surface treatment is a particularly useful method for improving pigment dispersibility in inks, toners, paints, coatings, and plastics.

The use of amines or amine derivatives in the preparation of pigment dispersions is known. For example, Czech Patent 227,779 discloses a two-step process for dispersing organic pigments in inks by first dispersing the pigments in the presence of ampholytic sulfonates of $C_{12}$–$C_{24}$ fatty acids and then coagulating the dispersed pigments with hydrophobic alkyl amines or ethoxylated $C_{12}$–$C_{24}$ fatty acids. European Patent Application 544,441 discloses dispersions of organic pigments in which the pigment is treated with a non-polar additive and dispersed in a solution containing a polar additive, including certain rosin amines or multifunctional amines. However, these two patents, besides requiring two-step treatments using two different types of dispersants, do not disclose the use of the sterically hindered and/or bulky primary amines and the cavitating conditions that are critical features of the present invention.

Japanese Patent 63/305,172 discloses the dispersion of organic pigments in inks in the presence of certain surfactants, including stearylamine and stearylpropyleneamine. This patent, however, does not disclose the treatment of organic pigments with sterically hindered and/or bulky primary amines under cavitating conditions, critical features of the present invention.

U.S. Pat. No. 4,929,279 discloses aqueous dispersions prepared by adding certain surfactants to an aqueous slurry of the pigment and then subjecting the treated pigment to ultrasonic irradiation. The surfactants include narrowly defined groups of diamines having two tertiary amino groups, two quaternary ammonium groups, or a combination of a secondary amino group with a primary amino group. This patent, however, does not disclose the treatment of organic pigments with the sterically hindered and/or bulky primary amines that are a critical feature of the present invention.

The use of sterically hindered and/or bulky primary amines in conjunction with cavitating conditions according to the present invention provides pigment compositions having improved dispersibility.

SUMMARY OF THE INVENTION

This invention relates to a process for preparing pigment compositions comprising (a) treating an organic pigment with
  (1) about 0.1 to about 100% by weight (preferably 5 to 20% by weight), relative to the organic pigment, of a sterically hindered and/or bulky primary amine,
  (2) 0 to about 100% by weight, relative to the organic pigment, of a surfactant, and
  (3) about 5 to about 15 parts by weight (preferably 6 to 12 parts by weight) per part by weight of the organic pigment of a liquid in which the organic pigment is substantially insoluble,
  thereby forming a suspension of the surface-treated pigment composition in the liquid;

(b) exposing the suspension to cavitating conditions (preferably ultrasonic conditions); and (c) collecting the pigment composition.

This invention further relates to pigment compositions prepared by the process of this invention and to the use of such pigment compositions in the pigmentation of plastics, coatings, fibers, printing inks (including ink jet inks), and the like.

DETAILED DESCRIPTION OF THE INVENTION

Suitable organic pigments for the process of the present invention include quinacridone, phthalocyanine, and perylene pigments, as well as other known organic pigments. Mixtures, including solid solutions, of such pigments are also suitable.

Quinacridone pigments are particularly suitable organic pigments. Quinacridones (which includes unsubstituted quinacridone, quinacridone derivatives, and solid solutions thereof) can be prepared by methods known in the art but are preferably prepared by thermally ring-closing various 2,5-dianilinoterephthalic acid precursors. E.g., S. S. Labana and L. L. Labana, "Quinacridones" in *Chemical Review*, 67, 1–18 (1967), and U.S. Pat. Nos. 3,157,659, 3,256,285, and 3,317,539. Suitable quinacridone pigments can be unsubstituted or substituted (for example, with one or more alkyl, alkoxy, halogens such as chlorine, or other substituents typical of quinacridone pigments).

Metal phthalocyanine pigments are also suitable organic pigments. Although copper phthalocyanines are preferred, other metal-containing phthalocyanine pigments, such as those based on zinc, cobalt, iron, nickel, and other such metals, may also be used. Suitable phthalocyanine pigments can be unsubstituted or partially substituted (for example, with one or more alkyl, alkoxy, halogens such as chlorine, or other substituents typical of phthalocyanine pigments).

Perylenes, particularly the diimides and dianhydrides of perylene-3,4,9,10-tetracarboxylic acid, are also suitable organic pigments. Suitable perylene pigments can be unsubstituted or substituted (for example, with one or more alkyl, alkoxy, halogens such as chlorine, or other substituents typical of perylene pigments).

Other suitable organic pigments include dioxazines (that is, triphenedioxazines), 1,4-diketopyrrolopyrroles, anthrapyrimidines, anthanthrones, flavanthrones, indanthrones, isoindolines, isoindolinones, perinones, pyranthrones, thioindigos, 4,4'-diamino-1,1'-dianthraquinonyl, and azo compounds, as well as substituted derivatives.

The organic pigment is first mixed in step (a) with a sterically hindered and/or bulky primary amine and any optional surfactants in a liquid in which the organic pigment is substantially insoluble.

Suitable sterically hindered primary amines (a)(1) are amines in which one or more primary amino groups are located in a sterically crowded region of the amine molecule or are attached to a sterically bulky aliphatic group. Although the preferred primary amines (a)(1) are those in which the amino group is attached directly to a sterically crowded carbon atom, it is also possible for the amino functionality to be attached to a less hindered carbon atom, including a —CH₂— group, as long as the moiety to which the amino group is attached is sterically bulky. That is, the amino group of such amines is in a crowded region of the amine molecule but is still able to interact with the pigment surface being treated. Such amines are often highly branched. Regardless of whether the amines are considered sterically hindered, sterically bulky, or both, such amines are characterized by their being sufficiently hydrophobic that they remain adsorbed on the pigment surface in an aqueous or other polar medium. Amines (a)(1) can, of course, contain two or more amino groups as long as all such amino groups are located in a sterically crowded region of the amine molecule or are attached to a sterically bulky group.

Particularly preferred sterically hindered and/or bulky primary amines (a)(1) are tertiary alkyl primary amines having formula (I)

in which $R^1$ is a $C_5$–$C_{30}$ (cyclo)aliphatic group (preferably a $C_5$–$C_{22}$ aliphatic group), and $R^2$ and $R^3$ are independently $C_1$–$C_6$ alkyl (preferably methyl). The term "$C_1$–$C_6$ alkyl" refers to straight or branched chain aliphatic hydrocarbon groups having from 1 to 6 carbon atoms. Examples of $C_1$–$C_6$ alkyl are methyl, ethyl, propyl, butyl, pentyl, hexyl, and the isomeric forms thereof. The $R^2$ and $R^3$ groups, however, should not be branched at the carbon atom attached to the C—NH₂ group. The term "$C_5$–$C_{30}$ (cyclo)aliphatic" as used herein refers to branched and unbranched, saturated and unsaturated aliphatic groups, as well as groups consisting of or containing cycloaliphatic groups, having 5 to 30 carbon atoms. The $R^1$ group, however, is preferably not branched or unsaturated at the carbon atom attached directly to the C—NH₂ group. Examples of suitable $C_5$–$C_{30}$ (cyclo)aliphatic groups include $C_5$–$C_{30}$ alkyl, $C_5$–$C_{30}$ alkenyl, $C_5$–$C_{30}$ alkadienyl, $C_5$–$C_{30}$ alkatrienyl, as well as the isomeric branched forms thereof, and $C_5$–$C_8$ cycloalkyl, $C_5$–$C_8$ cycloalkenyl, and $C_5$–$C_8$ cycloalkadienyl. Examples of suitable $C_5$–$C_{30}$ (cyclo)aliphatic groups also include alkyl, alkenyl, alkadienyl, and alkatrienyl groups in which the main chain is interrupted with one or more $C_5$–$C_8$ cycloalkylene, $C_5$–$C_8$ cycloalkenylene, or $C_5$–$C_8$ cycloalkadienylene groups as long as the number of carbon atoms totals no more than 30 carbon atoms. Although generally not preferred, it is also possible to include (cyclo)aliphatic groups in which one or more of the (cyclo)aliphatic carbon atoms is substituted with halogen (such as fluorine or chlorine), $C_1$–$C_6$ alkoxy, or $C_6$–$C_{10}$ aromatic hydrocarbon (preferably phenyl or naphthyl) that can itself optionally be substituted. It is also possible, but much less preferred, to replace one or more non-adjacent (cyclo)aliphatic carbon atoms with an oxygen or sulfur atom or a $NR^a$ group (in which $R^a$ is $C_1$–$C_6$ alkyl or $C_6$–$C_{10}$ aryl). It is even possible to replace one or more non-adjacent aliphatic chain carbon atoms of the $R^1$ group with an aromatic ring, such as a benzene ring (although the resultant group would not in a formal sense be an "aliphatic" group). In general, the preferred tertiary alkyl primary amines are those in which the $R^1$ group is an acyclic aliphatic group having from 5 to 22 carbon atoms. The term "$C_5$–$C_{30}$ alkyl" as used for the $R^1$ group refers to alkyl groups having from 5 to 30 carbon atoms, such as pentyl, hexyl, lauryl (i.e., dodecyl), myristyl (i.e., tetradecyl), cetyl (i.e., hexadecyl), stearyl (i.e., octadecyl), eicosanyl, docosanyl, and isomeric forms thereof. The terms "$C_5$–$C_{30}$ alkenyl", "$C_5$–$C_{30}$ alkadienyl", and "$C_5$–$C_{30}$ alkatrienyl" refer to corresponding unsaturated groups having one, two, and three carbon-carbon double bonds, respectively. The term "$C_5$–$C_8$ cycloalkyl" refers to cycloaliphatic hydrocarbon groups having from 5 to 8 carbon atoms. Examples of $C_5$–$C_7$ cycloalkyl are cyclopentyl, cyclohexyl, cycloheptyl, and cycloaliphatic. The terms "$C_5$–$C_8$ cycloalkenyl" and "$C_5$–$C_8$ cycloalkadienyl" refer to corresponding unsaturated cyclic groups having one and two carbon-carbon double bonds, respectively. The terms "$C_5$–$C_8$ cycloalkylene", "$C_5$–$C_8$ cycloalkenylene", and "$C_5$–$C_8$ cycloalkadienylene" refer to the corresponding difunctional cycloaliphatic groups. The term "$C_1$–$C_6$ alkoxy" refers to straight or branched chain alkyl oxy groups having from 1 to 6 carbon atoms. Examples of $C_1$–$C_6$ alkoxy are methoxy, ethoxy, propoxy, butoxy, pentyloxy, hexyloxy, and the isomeric forms thereof. The term "$C_6$–$C_{10}$ aromatic hydrocarbon" refers to phenyl and 1- or 2-naphthyl, as well as phenyl and naphthyl groups substituted with $C_1$–$C_6$ alkyl, $C_1$–$C_6$ alkoxy, or halogen. Examples of suitable halogen are fluorine, chlorine, and bromine. Suitable tertiary alkyl primary amines are available commercially under the name PRIMENE from Rohm and Haas Company (Philadelphia, Pa.).

Other suitable primary amines (a)(1) include compounds in which the amino group is not attached directly to a sterically crowded carbon atom but is instead attached to a group that is sterically bulky in the sense described above. Examples of suitable such bulky primary amines are rosin amines or rosinylamines and derivatives thereof, including dehydroabietylamine, dehydroabietan-1-amine, dihydroabietylamine, tetrahydroabietylamine, as well as dimeric, trimeric, tetrameric, or polymeric forms thereof, and mixtures thereof. Suitable amines (a)(1), which can be either natural or synthetic, can be used as free amines or as amine salts of inorganic or organic acids. A particularly preferred amine of this type is dehydroabietylamine (which has the formula (II))

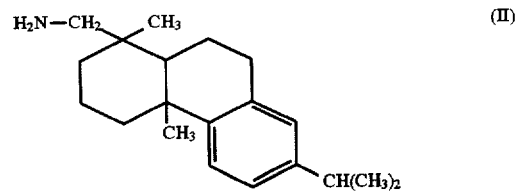

and salts thereof, such as acetate, formate, hydrochloride, phosphate, and sulfonate salts (including partial esters of polyfunctional acids). Dehydroabietylamine and its acetate salt are available from Hercules Incorporated (Wilmington, Del.).

Optional surfactants (a)(2) include non-ionic, cationic, zwitterionic, amphoteric, and anionic surfactants known in the art. The preferred surfactants are anionic surfactants containing carboxylate, sulfonate, phosphate, or phosphonate groups, either as the free acids or as the alkali metal, alkaline earth metal, or ammonium salts (especially the sodium or potassium salts). Particularly preferred anionic surfactants are sulfosuccinates, sulfosuccinamates, and derivatives thereof. Examples of suitable sulfosuccinates are disodium sulfosuccinate, sodium diamyl sulfosuccinate, sodium dibutyl sulfosuccinate, sodium diisobutyl sulfosuccinate, dihexyl sulfosuccinate, sodium dihexyl sulfosuccinate, dioctyl sulfosuccinate, sodium dioctyl sulfosuccinate, sodium diisooctyl sulfosuccinate, disodium isodecyl sulfosuccinate, bis(tridecyl) sulfosuccinate, sodium bis(tridecyl) sulfosuccinate, lauric sulfosuccinate, disodium lauryl sulfosuccinate, diammonium lauryl sulfosuccinate, sodium dicyclohexyl sulfosuccinate, other sodium alkylsulfosuccinates and disodium (cyclo)-alkylsulfosuccinates, disodium laureth sulfosuccinate, lauryl ether sulfosuccinate, disodium lauramido-ethanolamine sulfosuccinate, sodium sulfosuccinate ester of lauric diethanolamide, disodium lauramido-isopropanolamine sulfosuccinate, oleic sulfosuccinate, ricinoleic sulfosuccinate, disodium oleth-3-sulfosuccinate, disodium oleamido-ethanolamine sulfosuccinate, disodium oleamido-isopropanolamine sulfosuccinate, disodium mono-oleamido PEG-2 sulfosuccinate, coconut sulfosuccinate, disodium cocamido-isopropanolamine sulfosuccinate, the ethoxylated alcohol half ester of disodium sulfosuccinate, disodium nonoxynol-10-sulfosuccinate, and disodium mono- and didodecyl-diphenyloxide disulfonate. Examples of suitable sulfosuccinamates are disodium N-octadecylsulfosuccinamate and other N-alkyl- and N-dialkyl sulfosuccinamates and tetrasodium N-(1,2-dicarboxyethyl)-N-octadecyl sulfosuccinamate. Other suitable anionic dispersants include neodecanoic acid, sodium N-methyl-N-oleoyl taurate, sulfonated aliphatic polyesters, and aromatic sulfonate dispersants. Suitable nonionic surfactants include ethoxylated fatty acids and amides, ethoxylated alcohols, ethoxylated alkylphenols, and glycol esters. Suitable cationic surfactants include ethoxylated and/or propoxylated amines, diamines, and quaternary ammonium salts. Suitable amphoteric and zwitterionic suffactants include amine oxides and betaine derivatives. Mixtures of surfactants are, of course, also suitable.

Surface treatment step (a) is carried in a liquid (a)(3) in which the organic pigment is substantially insoluble and which is suitably stable under the cavitation conditions used in step (b). Preferred liquids (a)(3) include water, water-miscible organic liquids (such as methanol, or other lower aliphatic alcohols), or mixtures thereof. It is desirable, but not necessary, for sterically hindered and/or bulky primary amines (a)(1) to be at least partly insoluble in liquid (a)(3). Optional surfactants (a)(2) are often soluble in liquid (a)(3) but solubility is not an essential feature. Examples of suitable liquids (a)(3) are water and/or water-miscible organic liquids, including, for example, lower aliphatic alcohols, such as methanol; ketones and ketoalcohols, such as acetone, methyl ethyl ketone, and diacetone alcohol; amides, such as dimethylformamide and dimethylacetamide; ethers, such as tetrahydrofuran and dioxane; alkylene glycols and triols, such as ethylene glycol and glycerol; and other such organic liquids known in the art. Other organic liquids can be used but are generally less preferred.

The temperature at which surface treatment is carried out is generally not critical but is usually maintained between about 5° C. and about 200° C. Temperatures between 5° C. and the boiling point of the mixture (which may be under pressure) are generally preferred.

Cavitation step (b) can be carried out using any known method but is preferably carried out using ultrasound as described, i.e., in U.S. Pat. Nos. 4,588,576 and 4,929,279. Ultrasonic irradiation (i.e., sonication) can be carried out by any conventional system in which an appropriate vessel is equipped with a source of high frequency vibrations, such as a piezoelectric, mechanical, or magnetorestrictive acoustic generator. Sound frequencies ranging from about 15 to about 20,000 kilohertz are suitable, although frequencies between about 15 and about 3,000 kilohertz are generally preferred. The intensity of the ultrasound is generally between about 20 and 500 watts/cm$^2$. The temperature at which the optional cavitation step is carried out is generally not critical but is usually maintained between about 5° C. and about 80° C. For safety reasons, the temperature is preferably kept well below the boiling point of the liquid medium used for cavitation.

The resultant pigment is collected in step (c) by methods known in the art but is preferably collected by filtration followed by washing to remove residual acid. Other collection methods known in the art, such as centrifugation or even simple decantation, are suitable but generally less preferred. The pigment is then dried for use or for further manipulation before use.

The pigments of this invention are highly water-resistant, oil-resistant, acid-resistant, lime-resistant, alkali-resistant, solvent-resistant, fast to over-lacquering, fast to over-spraying, fast to sublimation, heat-resistant, and resistant to vulcanizing, yet give a very good tinctorial yield and are readily dispersible (for example, in plastic materials). Because of their light stability and migration properties, the pigments according to the present invention are suitable for many different pigment applications. For example, pigments prepared according to the invention can be used as the colorant (or as one of two or more colorants) for lightfast pigmented systems.

The pigments of the present invention are particularly suitable for use with macromolecular materials, especially synthetically produced macromolecular substances. Examples of synthetic macromolecular substances include plastic materials, such as polyvinyl chloride, polyvinyl acetate, and polyvinyl propionate; polyolefins, such as polyethylene and polypropylene; high molecular weight polyamides; polymers and copolymers of acrylates, methacrylates, acrylonitrile, acrylamide, butadiene, or styrene; polyurethanes; and polycarbonates. Other suitable macromolecular substances include those of a natural origin, such as rubber; those obtained by chemical modification, such as acetyl cellulose, cellulose butyrate, or viscose; or those produced synthetically, such as polymers, polyaddition products, and polycondensates. The materials pigmented with the pigments of the invention can have any desired shape or form.

The pigments of the present invention are also suitable for pigmented mixtures with other materials, pigment formulations, paints, printing ink, and colored paper. The term "mixtures with other materials" is understood to include, for example, mixtures with inorganic white pigments, such as titanium dioxide (rutile) or cement, or other inorganic pigments. Examples of pigment formulations include flushed pastes with organic liquids or pastes and dispersions with water, dispersants, and, if appropriate, preservatives. Examples of paints in which pigments of this invention can be used include, for example, physically or oxidatively drying lacquers, stoving enamels, reactive paints, two-component paints, solvent- or water-based paints, emulsion paints for weatherproof coatings, and distempers. Printing inks include those known for use in paper, textile, and tinplate printing.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Quinacridones

The following quinacridone pigments were used as starting materials for the Examples:

Quinacridone (beta form), 2,9-dimethylquinacridone, and 2,9-dichloroquinacridone were prepared according to the method described in U.S. Pat. No. 3,342,828 and obtained in crude presscake form by drowning the reaction mixtures in methanol. The resultant crude pigments were collected but not conditioned or surface treated.

Sterically Hindered and Bulky Primary Amines

The following sterically hindered and bulky primary amines according to the invention were used in the Examples:

| | |
|---|---|
| Amine A | A tertiary $C_{16}$–$C_{22}$ amine available as PRIMENE ® JM-T from Rohm and Haas Company, Philadelphia, PA |
| Amine B | Dehydroabietylamine acetate available as Amine D Acetate from Hercules Inc. (Wilmington, Delaware) |

Dispersibility in PVC

Dispersibilities of pigments prepared according to the examples were determined in polyvinyl chloride ("PVC") using untreated pigments and/or commercially available pigments for comparison. Dispersibility was evaluated by comparing hot-milled and cold-milled color development according to the following procedure. For each sample tested, a 50 g portion of flexible PVC was added to a hot (155° C.) two-roll mill having a nip thickness of 25 mils (ca. 0.6 mm) and fluxed until uniform. A 0.050 g portion of the test pigment or comparison pigment was sprinkled into the nip over a period of about ten seconds, after which the fluxed material was cut and rolled on the mill for five minutes. The pigmented sheet was then removed from the mill and placed on a clean flat surface to cool. A piece cut from the resultant sheet and allowed to cool to room temperature was used as the "hot-milled" sample for evaluation. A sample cut from the same sheet while still warm was placed on a cold (24° C.) two-roll mill having a nip thickness of 21 mils (ca. 0.5 mm), then folded and passed through the mill seven times. The cold-rolled sheet was again fluxed in the hot mill until smooth. A sample cut from the resultant sheet was used as the "cold-milled" sample for evaluation. Color development was evaluated using a scale of 1 to 5 based on the difference between hot-milled and cold-milled color development, where 1 represents poor dispersibility (as evidenced by extreme differences in color development) and 5 represents excellent dispersibility (as evidenced by essentially no difference in color development).

The following commercially available pigments were used as comparison standards in the dispersibility tests for 2.9-dichloroquinacridone and quinacridone pigments:

| | |
|---|---|
| Standard A | 2,9-Dichloroquinacridone available as MONASTRAL ® Magenta RT-235-D from Ciba-Geigy Corp. |
| Standard B | Quinacridone available as QUINDO ® Magenta RV-6911 from Bayer Corporation |
| Standard C | Red-shade quinacridone available as QUINDO ® Magenta RV-6704 from Bayer Corporation |

Color Evaluations

A rubout test was used for evaluation of color and appearance of the pigments. Dispersions were prepared on a Hoover Automatic Muller Model M4 (Hoover Color Corporation, Hiwassee, Va.) fitted with two glass plates and one 50-lb (ca. 22.5-kg) weight. For the masstone dispersion, 200 mg of dry pigment was added to 240 mg of raw linseed oil (distributed by United Specialties of America, Orlando, Fla.) and the mixture was placed on the bottom plate of the muller. After the upper plate was placed in contact with the lower plate, the bottom plate was allowed to turn for 50 revolutions. After the plates were separated, the paste on the upper plate was removed with a spatula and added to the bottom plate. This dispersion process was repeated three more times. The resultant paste was diluted with 480 mg of raw linseed oil and the muller dispersion process was repeated two times. A small amount of the resultant masstone dispersion was placed on a slide and evaluated in comparison with a comparison dispersion prepared by the same muller dispersion process.

The rubout test also included an undertone (tint) evaluation using 100 mg of the (final) masstone dispersion and 2.0 g of Zinc Oxide Bleach White W-3689 (Superior Printing Inks, New York, N.Y.). This mixing process was carried out using a spatula. The undertone was also compared to the comparison undertone dispersion.

Example 1 (Comparison)

2.9-Dimethylquinacridone was prepared in the absence of a sterically hindered or bulky primary amine, a surfactant, and sonication.

Crude 2.9-dimethylquinacridone presscake (120.0 g, corresponding to 25.0 g of 100% strength pigment) was reslurried in 155.0 g of water. The slurry was heated at 140°–145° C. for two hours in a laboratory Parr reactor. The mixture was allowed to cool to room temperature and the pH was adjusted to 3.4. The slurry was stirred at 60° C. for 30 minutes, after which the resultant slurry was filtered and washed with water. The wet presscake was dried in the oven at 60° C. overnight to yield 25.0 g of a magenta (i.e., red-violet) comparison pigment.

Example 2 (Comparison)

2.9-Dimethylquinacridone was prepared in the presence of a sterically hindered and/or bulky primary amine but in the absence of a surfactant and sonication.

Crude 2.9-dimethylquinacridone presscake (120.0 g, corresponding to 25.0 g of 100% strength pigment) was reslurried in 155.0 g of water and 5.0 g of Amine A. The slurry was heated at 140°–145° C. for two hours in a laboratory Parr reactor. The mixture was allowed to cool to room temperature and the pH was adjusted to 3.4. The slurry was stirred at 60° C. for 30 minutes, after which the resultant slurry was filtered and washed with water. The wet presscake was dried in the oven at 60° C. overnight to yield 27.8 g of a magenta pigment having good dispersibility in PVC, as shown in Table 1.

Example 3 (Comparison)

2.9-Dimethylquinacridone was prepared in the presence of a sterically hindered and/or bulky primary amine and a surfactant but in the absence of sonication.

Crude 2.9-dimethylquinacridone presscake (120.0 g, corresponding to 25.0 g of 100% strength pigment) was reslurried in 155.0 g of water and 5.0 g of Amine A. The slurry was heated at 140°–145° C. for two hours in a laboratory Parr reactor. The mixture was allowed to cool to room temperature and the pH was adjusted to 3.4. An emulsion of 0.9 g of an anionic sulfosuccinate suffactant, 13.1 g of petroleum distillate, and 25.0 g of water was added, and the slurry was stirred at 50° C. for three hours, after which the resultant slurry was filtered and washed with water. The wet presscake was dried in the oven at 60° C overnight to yield 29.3 g of a magenta pigment having good dispersibility in PVC, as shown in Table 1.

Example 4

2,9-Dimethylquinacridone was prepared in the presence of a sterically hindered and/or bulky primary amine, a surfactant, and sonication.

Crude 2,9-dimethylquinacridone presscake (83.3 g, corresponding to 17.0 g of 100% strength pigment) was reslurried in 92.0 g of water and 3.4 g of Amine A. The slurry was heated at 140°–145° C. for two hours in a laboratory Parr reactor. The mixture was allowed to cool to room temperature and the pH was adjusted to 3.4. An emulsion of 0.9 g of an anionic sulfosuccinate suffactant, 13.1 g of petroleum distillate, and 25.0 g of water was added and the mixture was sonicated at room temperature for three hours with a sonic horn (20 kHz, 25–50 watts), after which the resultant slurry was filtered and washed with water. The wet presscake was dried in the oven at 60° C. overnight to yield 17.6 g of a magenta pigment having very good dispersibility in PVC, as shown in Table 1.

TABLE 1

Dispersibilities in PVC for the 2,9-Dimethylquinacridone Pigments of Comparison Examples 1–3 and Example 4 of the Invention

| Test Sample | Dispersibility |
| --- | --- |
| Example 1 (comparison) | 1 |
| Example 2 (comparison) | 2–3 |
| Example 3 (comparison) | 3 |
| Example 4 | 4 |

Example 5 (Comparison)

2,9-Dichloroquinacridone was prepared in the absence of a sterically hindered or bulky primary amine, a surfactant, and sonication.

Crude 2,9-dichloroquinacridone presscake (115 g, corresponding to 34.5 g of 100% strength pigment) was reslurried in 436 g of water. The slurry was heated at 140°–145° C. for two hours in a laboratory Parr reactor. The mixture was allowed to cool to room temperature, after which the resultant slurry was filtered and washed with water. The wet presscake was dried in the oven at 60° C. overnight to yield 32 g of a magenta comparison pigment.

Example 6

Pigmentary 2,9-dichloroquinacridone was prepared in the presence of a sterically hindered and/or bulky primary amine, a surfactant, and sonication.

Crude 2,9-dichloroquinacridone presscake (39.0 g, corresponding to 13.0 g of 100% strength pigment) was reslurried in 92.0 g of water and 2.6 g of Amine A. The slurry was heated at 140°–145° C. for two hours in a laboratory Parr reactor. The mixture was allowed to cool to room temperature and the pH was adjusted to 3.2. An emulsion of 0.65 g of an anionic sulfosuccinate surfactant and 9.0 g of petroleum distillate in water was added and the mixture was sonicated at room temperature for three hours with a sonic horn (20 kHz, 25–50 watts), after which the resultant slurry was filtered and washed with water. The wet presscake was dried in the oven at 60° C. overnight to yield 13.9 g of a magenta pigment having excellent dispersibility in PVC, as shown in Table 2.

TABLE 2

Dispersibility in PVC for the 2,9-Dimethylquinacridone Pigments of Comparison Example 5, Standard A, and Example 6 of the Invention

| Test Sample | Dispersibility |
| --- | --- |
| Example 5 (comparison) | 1–2 |
| Standard A | 3 |
| Example 6 | 4–5 |

Example 7

Pigmentary quinacridone was prepared in the presence of a sterically hindered and/or bulky primary amine, a surfactant, and sonication.

Crude beta-form quinacridone presscake (50.0 g, corresponding to 18.3 g of 100% strength pigment) was reslurried in 145.0 g of water and 3.6 g of Amine A. The slurry was heated at 140°–145° C. for two hours in a laboratory Parr reactor. The mixture was allowed to cool to room temperature and the pH was adjusted to 3.2. An emulsion of 0.65 g of an anionic sulfosuccinate suffactant and 9.0 g of petroleum distillate in water was added and the mixture was sonicated at 25° C. for three hours with a sonic horn (20 kHz, 25–50 watts), after which the resultant slurry was filtered and washed with water. The wet presscake was dried in the oven at 60° C. overnight to yield 18.2 g of a violet pigment having excellent dispersibility in PVC, as shown in Table 3.

TABLE 3

Dispersibility in PVC for the Quinacridone Pigments of Standard B and Example 7 of the Invention

| Test Sample | Dispersibility |
| --- | --- |
| Standard B | 2–3 |
| Example 7 | 4–5 |

Example 8 (Comparison)

A red-shade quinacridone was prepared in the presence of a sterically hindered and/or bulky primary amine but in the absence of a surfactant and sonication.

To 150 g of polyphosphonic acid (117% phosphoric acid) heated at 80° C. was added 60 g of 2,5-dianilinoterephthalic acid over a period of 30 minutes, the temperature being maintained below 95° C. by adjusting the addition rate. The reaction mixture was heated at 103°–105° C. for six hours. After being cooled to 95° C., the reaction mixture was slowly poured into 300 g of water containing 1.5 g of Amine B at 10° C., the temperature being maintained below 25° C. by external cooling and adjustment of melt addition rate. The slurry was heated at 50° C. for 30 minutes, after which the solid component was collected by filtration and washed with water. The resultant crude quinacridone presscake (115.0 g, corresponding to 20.0 g of 100% strength pigment) was reslurried in 65.0 g of water. After adjustment of the pH to 8.5 with sodium hydroxide, 150.0 g of methanol was added. The resultant slurry was heated at 120° C. for six hours in a laboratory Parr reactor. The slurry was allowed to cool to room temperature and the solid component was collected by filtration and washed with water. The wet presscake was dried in an oven at 60° C. overnight to yield 20.0 g of a red-shade magenta pigment.

Example 9

Pigmentary red-shade quinacridone was prepared in the presence of a sterically hindered and/or bulky primary amine, a surfactant, and sonication.

To 150 g of polyphosphoric acid (117% phosphoric acid) heated at 80° C. was added 60 g of 2,5-dianilinoterephthalic acid over a period of 30 minutes, the temperature being maintained below 95° C. by adjusting the addition rate. The reaction mixture was heated at 103°–105° C. for six hours. After being cooled to 95° C., the reaction mixture was slowly poured into 300 g of water containing 1.5 g of Amine B at 10° C., the temperature being maintained below 25° C. by external cooling and adjustment of melt addition rate. The slurry was heated for 30 minutes at 50° C. with the concurrent application of ultrasound using a conventional sonic cleaning bath (43–47 kHz, maximum input of 80–320 watts), after which the solid component was collected by filtration and washed with water. The resultant crude quinacridone presscake (115.0 g, corresponding to 20.0 g of 100% strength pigment) was reslurried in 65.0 g of water. After adjustment of the pH to 8.5 with sodium hydroxide, 150.0 g of methanol was added. The resultant slurry was heated at 120° C. for six hours in a laboratory Parr reactor. The slurry was allowed to cool to room temperature and the solid component was collected by filtration and washed with water. The wet presscake was dried in an oven at 60° C. overnight to yield 20.0 g of a red-shade magenta pigment having excellent dispersibility in PVC, as shown in Table 4.

TABLE 4

Dispersibility in PVC for the Red-shade Quinacridone Pigments of Comparison Example 8, Standard C, and Example 9 of the Invention

| Test Sample | Dispersibility |
| --- | --- |
| Example 8 (comparison) | 2 |
| Standard C | 2 |
| Example 9 | 4–5 |

What is claimed is:

1. A process for preparing a pigment composition comprising (a) treating an organic pigment with
      (1) about 0.1 to about 100% by weight, relative to the organic pigment, of a sterically hindered and/or bulky primary amine,
      (2) 0 to about 100% by weight, relative to the organic pigment, of a surfactant, and
      (3) about 5 to about 15 parts by weight per part by weight of the organic pigment of a liquid in which the organic pigment is substantially insoluble,
   thereby forming a suspension of the surface-treated pigment composition in the liquid;

(b) exposing the suspension to ultrasound; and (c) collecting the pigment composition.

2. A process according to claim 1 wherein the organic pigment is treated with 5 to 20% by weight relative to the organic pigment, of a sterically hindered and/or bulky primary amine.

3. A process according to claim 1 wherein the sterically hindered and/or bulky primary amine (a)(1) is a tertiary alkyl primary amine having the formula

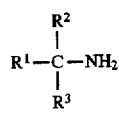

wherein $R^1$ is a $C_5$–$C_{30}$ (cyclo)aliphatic group, and $R^2$ and $R^3$ are independently $C_1$–$C_6$ alkyl.

4. A process according to claim 1 wherein the sterically hindered and/or bulky primary amine (a)(1) is a rosin amine, a rosinylamine, or a derivative thereof.

5. A process according to claim 1 wherein the sterically hindered and/or bulky primary amine (a)(1) is dehydroabietylamine.

6. A process according to claim 1 wherein 6 to 12 parts by weight per part by weight of the organic pigment of liquid (a)(3) is used.

7. A process according to claim 1 wherein liquid (a)(3) is water, a water-miscible organic liquid, or a mixture thereof.

8. A process according to claim 1 wherein the pigment composition is collected by filtration.

9. A process according to claim 1 wherein step (b) is carried out using ultrasound at a frequency of about 15 to about 20,000 kilohertz at an intensity of about 20 to about 500 watts/cm$^2$.

10. A pigment composition prepared according to a process comprising (a) treating an organic pigment with
      (1) about 0.1 to about 100% by weight, relative to the organic pigment, of a sterically hindered and/or bulky primary amine,
      (2) 0 to about 100% by weight, relative to the organic pigment, of a surfactant, and
      (3) about 5 to about 15 parts by weight per part by weight of the organic pigment of a liquid in which the organic pigment is substantially insoluble,
   thereby forming a suspension of the surface-treated pigment composition in the liquid;

(b) exposing the suspension to ultrasound; and (c) collecting the pigment composition.

11. A pigmented macromolecular material containing as pigment a pigment composition prepared according to a process comprising (a) treating an organic pigment with
      (1) about 0.1 to about 100% by weight, relative to the organic pigment, of a sterically hindered and/or bulky primary amine,
      (2) 0 to about 100% by weight, relative to the organic pigment, of a surfactant, and
      (3) about 5 to about 15 parts by weight per part by weight of the organic pigment of a liquid in which the organic pigment is substantially insoluble,
   thereby forming a suspension of the surface-treated pigment composition in the liquid;

(b) exposing the suspension to ultrasound; and (c) collecting the pigment composition.

12. A pigmented coating composition containing as pigment a pigment composition prepared according to a process comprising (a) treating an organic pigment with
      (1) about 0.1 to about 100% by weight, relative to the organic pigment, of a sterically hindered and/or bulky primary amine,
      (2) 0 to about 100% by weight, relative to the organic pigment, of a surfactant, and (3) about 5 to about 15 parts by weight per part by weight of the organic pigment of a liquid in which the organic pigment is substantially insoluble, thereby forming a suspension of the surface-treated pigment composition in the liquid;

(b) exposing the suspension to ultrasound; and (c) collecting the pigment composition.

13. A pigmented printing ink containing as pigment a pigment composition prepared according to a process comprising (a) treating an organic pigment with (1) about 0.1 to about 100% by weight, relative to the organic pigment, of a sterically hindered and/or bulky primary amine, (2) 0 to about 100% by weight, relative to the organic pigment, of a surfactant, and (3) about 5 to about 15 parts by weight per part by weight of the organic pigment of a liquid in which the organic pigment is substantially insoluble, thereby forming a suspension of the surface-treated pigment composition in the liquid;

(b) exposing the suspension to ultrasound; and (c) collecting the pigment composition.

\* \* \* \* \*